(12) United States Patent
Ström et al.

(10) Patent No.: US 8,995,764 B2
(45) Date of Patent: Mar. 31, 2015

(54) METHOD AND AN ARRANGEMENT FOR TEXTURE COMPRESSION

(75) Inventors: Jacob Ström, Stockholm (SE); Jim Rasmusson, Vellinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/009,440

(22) PCT Filed: Aug. 24, 2011

(86) PCT No.: PCT/EP2011/064528
§ 371 (c)(1),
(2), (4) Date: Oct. 2, 2013

(87) PCT Pub. No.: WO2012/136280
PCT Pub. Date: Oct. 11, 2012

(65) Prior Publication Data
US 2014/0023287 A1    Jan. 23, 2014

Related U.S. Application Data

(60) Provisional application No. 61/471,263, filed on Apr. 4, 2011.

(51) Int. Cl.
*G06K 9/36* (2006.01)
*G06T 9/00* (2006.01)
*H04N 19/176* (2014.01)
*H04N 19/593* (2014.01)
(Continued)

(52) U.S. Cl.
CPC . *G06T 9/00* (2013.01); *G06T 9/004* (2013.01);
*H04N 19/176* (2014.11); *H04N 19/593* (2014.11); *H04N 19/126* (2014.11); *H04N 19/154* (2014.11)
USPC ............ 382/166; 382/162; 382/167; 382/232

(58) Field of Classification Search
USPC ......... 382/166, 162, 167, 232, 305, 243, 233; 345/582, 419, 418, 420, 564, 572, 544, 345/530, 611, 536, 552; 348/642, 599, 659, 348/43, E13.062
See application file for complete search history.

(56) References Cited

U.S. PATENT DOCUMENTS 7,372,990 B2 *   5/2008   Yamauchi et al. ............ 382/166
8,144,981 B2 *   3/2012   Pettersson et al. ............ 382/166

(Continued)

FOREIGN PATENT DOCUMENTS

WO    2005059839 A1    6/2005

OTHER PUBLICATIONS

Lin et al., "Fast Full-Search Block-Matching Algorithm for Motion-Compensated Video Compression,", IEEE Transactions on Communications, May 1997, pp. 527-531, vol. 45. No. 5.

(Continued)

*Primary Examiner* — Anh Do
(74) *Attorney, Agent, or Firm* — Murphy Bilak & Homiller, PLLC

(57) ABSTRACT

The embodiments of the present invention reduce the compression time in order to achieve a faster texture compression. That is achieved by guessing, i.e. estimating the best table or tables (e.g. from tables 0 to 7) representing luminance information, and to only execute the compression for the table(s) estimated to provide the best luminance information.

14 Claims, 6 Drawing Sheets

(51) Int. Cl.
*H04N 19/126* (2014.01)
*H04N 19/154* (2014.01)

(56) References Cited

U.S. PATENT DOCUMENTS

2004/0081357 A1  4/2004  Oldcorn et al.
2007/0237404 A1  10/2007  Strom

OTHER PUBLICATIONS

Pettersson et al., "Texture Compression: THUMB—Two Hues Using Modified Brightness," XP-002396817 Ericsson Research, Nov. 23, 2005, pp. 7-12.
Shavit et al., "MINMAX Bit Allocation for Quantization-Based Video Coders," IEEE Data Compression Conference, Mar. 29-31, 2005, pp. 1-10.
Strom et al., "iPACKMAN: High Quality, Low-Complexity Texture Compression for Mobile Phones," ACM SIGGRAPH/EUROGRAPHICS Conference on Graphics Hardware, Jul. 30-31, 2005, pp. 63-70, ACM Press, New York City, NY.
Sun et al., "DHTC: An Effective DXTC-based HDR Texture Compression Scheme," SIGGRAPH/EUROGRAPHICS Conference on Graphics Hardware, Jun. 20-21, 2008, pp. 85-94.
Wang et al., "Computation Reduction for Intra 4x4 Mode Decision with SATD Criterion in H.264/AVC," Sep. 6, 2007, pp. 121-127, vol. 1, No. 3.
Wang et al., "Study of Decimation/Interpolation and Its Application to DCT Image Coding," International Conference on Communication Technology, Aug. 21-25, 2000, pp. 981-984, vol. 1.

* cited by examiner

METHOD AND AN ARRANGEMENT FOR TEXTURE COMPRESSION

TECHNICAL FIELD

The embodiments of the present invention relate to a method and an arrangement for texture compression.

BACKGROUND

Today, Ericsson Texture Compression (ETC 1) [1] is available on many devices. For instance, Android supports ETC1 from version 2.2 (Froyo), meaning that millions of devices are running ETC1.

ETC1 was originally developed to be an asymmetric codec; decompression had to be fast, but compression was supposed to be done off-line and could take longer. However, recent developments have made it important to be able to compress an image to ETC 1-format very quickly.

Another texture compression format is DXT1. However, platforms built for OpenGL ES may support ETC1 but not DXT1. It is therefore desired to be able to transcode DXT1 textures to ETC1. This way, after transcoding, rendering can be done from ETC1 instead, for which there is hardware support. However, the transcoding has to be fast enough for the user not to notice. It has been estimated that transcoding 20 Megapixels in less than 30 seconds is the upper limit. Ideally, it should be faster than that, perhaps 5 seconds.

To that end, we have created a test system where we can transcode DXT1 textures to ETC 1 textures quickly.

It should be noted that fast ETC1 encoding is beneficial under many circumstances, not only when transcoding from DXT1 data.

A problem is that current methods for transcode DXT1 textures to ETC1 are not fast enough. Also, image quality has been sacrificed in order to obtain faster encoding.

As an example, the software package "etcpack" that Ericsson provides to Khronos users has three modes; "fast", "medium" and "slow". Even the "fast" mode takes around 640 seconds to encode 20 Megapixel of RGB8 data on a mobile device (exemplified by a Sony Ericsson Xperia X10 mini). This is more than 20 times the stipulated 30 seconds. A more stripped-down version of the same code called "average", takes about 264 seconds, but this is still eight times slower than necessary. We have recently hand-optimized the software so that it runs in 20 seconds on an X10 mini. However, further reducing the compression time is desirable.

One of the things that take the most times in the encoder is to select which modifying table of the ETC1 codec each half-block should use. To understand how this works we need to describe the ETC1 codec a bit more:

ETC1 compresses 4×4 blocks by treating them as two halfblocks. Each halfblock gets a "base color", and then the luminance (intensity) can be modified in the halfblock. This is illustrated in FIG. 1.

The halfblocks within the 4×4 halfblocks are either lying or standing. Only one base color per halfblock is used. Per-pixel luminance is added to the base color and the resulting image is shown in FIG. 1.

The luminance information is added in the following way: First one out of eight modifying tables is selected. Possible tables are:

Table 0: {−8, −2, 2, 8}
Table 1: {−17, −5, 5, 17}
Table 2: {−29, −9, 9, 29}
Table 3: {−42, −13, 13, 42}
Table 4: {−60, −18, 18, 60}
Table 5: {−80, −24, 24, 80}
Table 6: {406, −33, 33, 106}
Table 7: {483, −47, 47, 183}

The selected table number is stored in the block using a 3-bit index. Each pixel also has a two-bit 'pixel index' making it possible to select one of the four items in the table.

Assume for instance that the base color is (R, G, B)=(173, 200, 100) and that we have selected table 4. Assume a pixel has a pixel index of 11 binary, i.e., the last item (60) in the table should be selected. This value is then added to all the three channels (red, green and blue). By using the same value for all channels, the ETC1 format can avoid spending bits on three different values for the three color channels. The color of the pixel is thus calculated as (173,200,100)+(60,60,60)=(233,260,160), which is then clamped to the range [0, 255] to the color (233, 255, 160).

Note that this can be written as (173,200,100)+60(1,1,1)=(233,260,160), which can be interpreted as follows: The end result (233, 260, 160) must lie on a line which goes through the base color (170, 200, 100) and which has the direction (1,1,1). Of course the base color can vary, and so can the distance 60 along the line, but the direction (1,1,1) never changes, and this is due to the fact that we always add the same number to all the three color components. In general, a certain base color $b=(b_r, b_g, b_b)$ will mean that we can only reach colors on the line L:

$$L:(b_r,b_g,b_b)+t(1,1,1)$$

The final value is clamped so that all channels have values between 0 and 255. This means that the final color may not lie on the line L above. Indeed in the example above, (233, 260, 160) lies on the line, but after clamping to (233, 255, 160), it does not. However, the line often provides a good approximation of where the final color may end up.

The hard part in the compression is to find out which table is best for this halfblock. The current way to do this is to try all eight tables, calculate the error for all the pixels for each table, and see which table generates the smallest error.

As can be seen by the pseudo-code below this makes for quite a deep inner loop:

```
for all blocks
    for both half blocks
        for all tables
            for all pixels in half block
                for all modifier values in table
                    find modifier value for pixel
```

This is what takes most of the time during compression.

SUMMARY

An object with the embodiments of the present invention is to reduce the compression time in order to achieve a faster texture compression.

That is achieved by guessing, i.e. estimating the best table or tables (e.g. from tables 0 to 7) representing luminance information, and to only execute the compression for the table(s) estimated to provide the best luminance information.

The estimation of the best table(s) is achieved by mapping the base color to a coordinate system, where the axes are the R,G,B color components. Hence, the estimation of the best table is performed by projecting the pixel colors in a block of an image to a line L that goes through the base color and has the direction (1,1,1). Based on the distance between the base color and the pixel colors projected onto the line L, a suitable table for representing the luminance characteristics is selected.

According to a first aspect of embodiments of the present invention, a method in a processor for texture compression is provided. A texture to be compressed is divided into blocks, each comprising a plurality of pixels, and each block is represented by a base color and luminance information for each pixel. In the method, which is performed for a block to be compressed, the base color is mapped to a coordinate system, where axes of the coordinate system are the R,G,B color components, and for a plurality of pixels of the block pixel values of the block are projected to a line L that goes through the base color and has the direction (1,1,1) in the coordinate system. Further, a value relating to distances between the base color and the projection of the pixel values to the line L is determined and at least one table comprising a set of values to be used for representing luminance characteristics of each pixel values is selected based on the determined value.

According to a second aspect of embodiments of the present invention, a processor for texture compression is provided. A texture to be compressed is divided into blocks, each comprising a plurality of pixels, and each block is represented by a base color and luminance information for each pixel. The processor is configured to map the base color to a coordinate system, where axes of the coordinate system are the R,G,B color components and to project for a plurality of pixels of the block pixel values of the block to a line L that goes through the base color and has the direction (1,1,1) in the coordinate system. The processor is further configured to determine a value relating to distances between the base color and the projection of the pixel values to the line L, and to select at least one table comprising a set of values to be used for representing luminance characteristics of each pixel values based on the determined value.

DETAILED DESCRIPTION

As explained above an image to be compressed is divided into blocks that are further divided into halfblocks that are either lying or standing. Only one base color per half block is used. An image to be compressed is represented by a base color and luminance information. Hence each of the resulting image halfblocks comprises a base color and luminance information. The luminance information is added by selecting a table comprising table values indicating respective luminance information.

In accordance with embodiments of the present invention, the calculation time for compressing the images is decreased by selecting the table to be used by guessing, i.e., estimating which table(s) that would provide the best result instead of testing all tables and their table values and then selecting the table giving the best performance.

Figure 1:
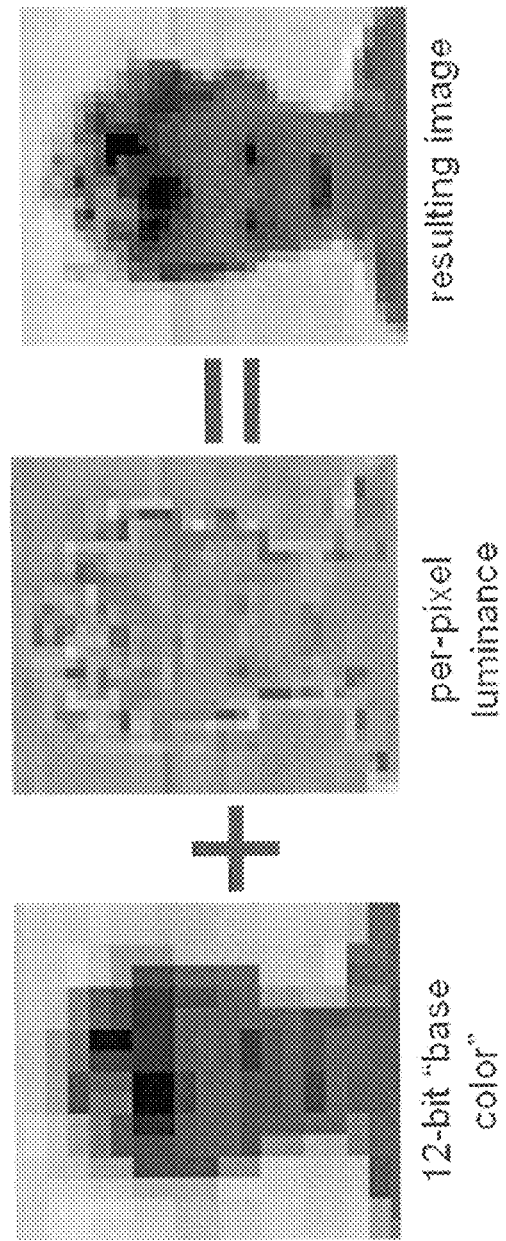
FIG. 1 illustrates that each halfblock gets a "base color", and then the luminance (intensity) according to prior art.
Figure 2:
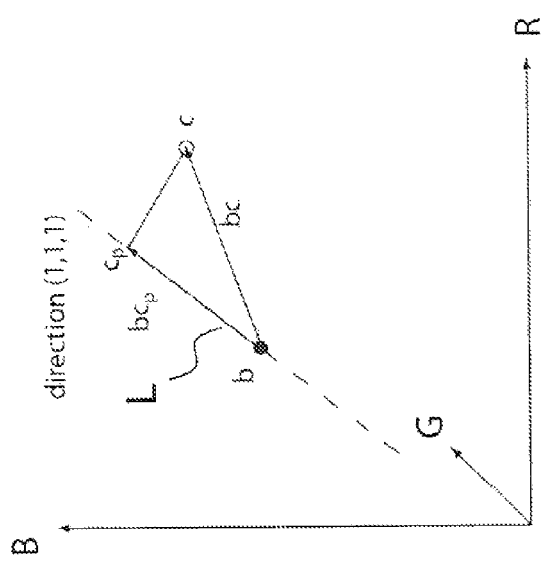
FIG. 2 illustrates schematically how a table is selected to represent luminance characteristics according to embodiments of the present invention.
Figure 3:
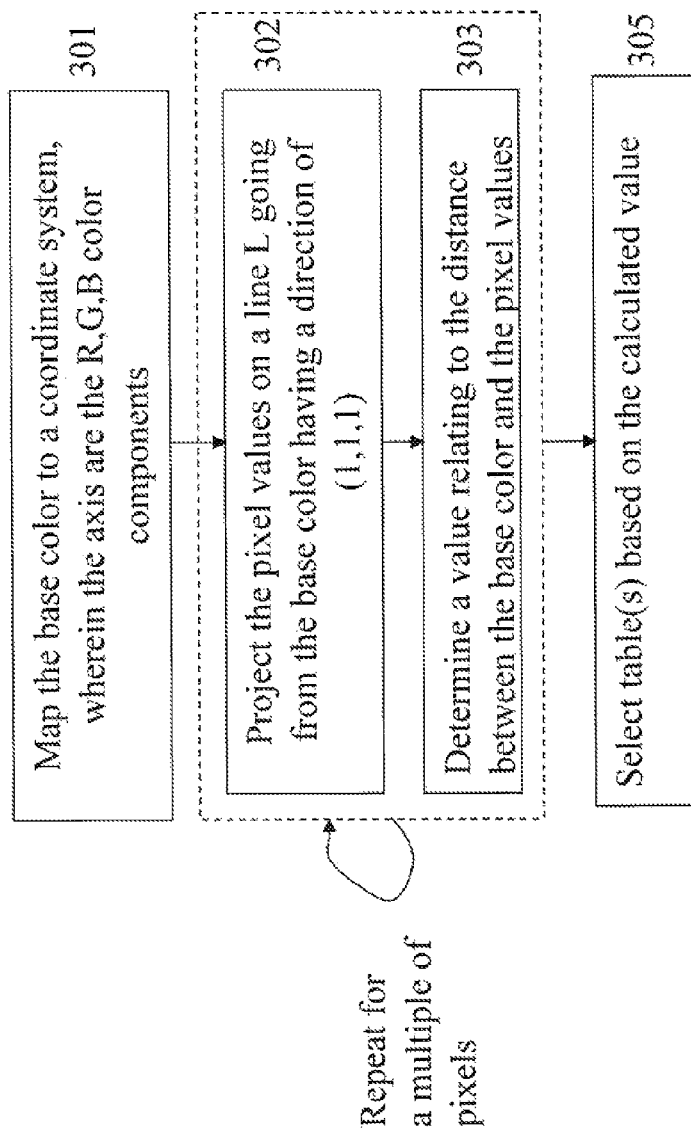
FIGS. 3-4 are flowchart showing methods according to embodiments of the present invention.

FIG. 3 is a flowchart illustrating a method according to one embodiment. Thus it can be assumed that the base color is mapped 301 to a coordinate system, where the axes are the R,G,B color components. As illustrated in FIG. 2, the pixel color c of the original image is projected 302 onto a line L going through the base color b with the direction (1,1,1). The result of the projection of the pixel color c is the point $c_p$.

Since the line L does not necessarily go through the origin, the vector to project is bc, which is calculated as c−b.

Thus, the estimation of the best table(s) is performed by projecting 302 the pixel colors in a block of an image onto a line L that goes through the base color and has the direction (1,1,1). Only points on this line are possible to reach given the base color (disregarding clamping effects).

According to one embodiment, a value is calculated 303 that relates to the distances between the base color and the projection of the pixel colors when they have been projected onto the line L: (br, bg, bb)+t(1,1,1). This can be done without explicitly calculating cp and instead calculating the value directly as "a"=cr−br+cg−bg+cb−bb according to this embodiment. One "a" for each pixel color in the halfblock is calculated. Based on the "a"-value a suitable table is selected 305.

Figure 4:
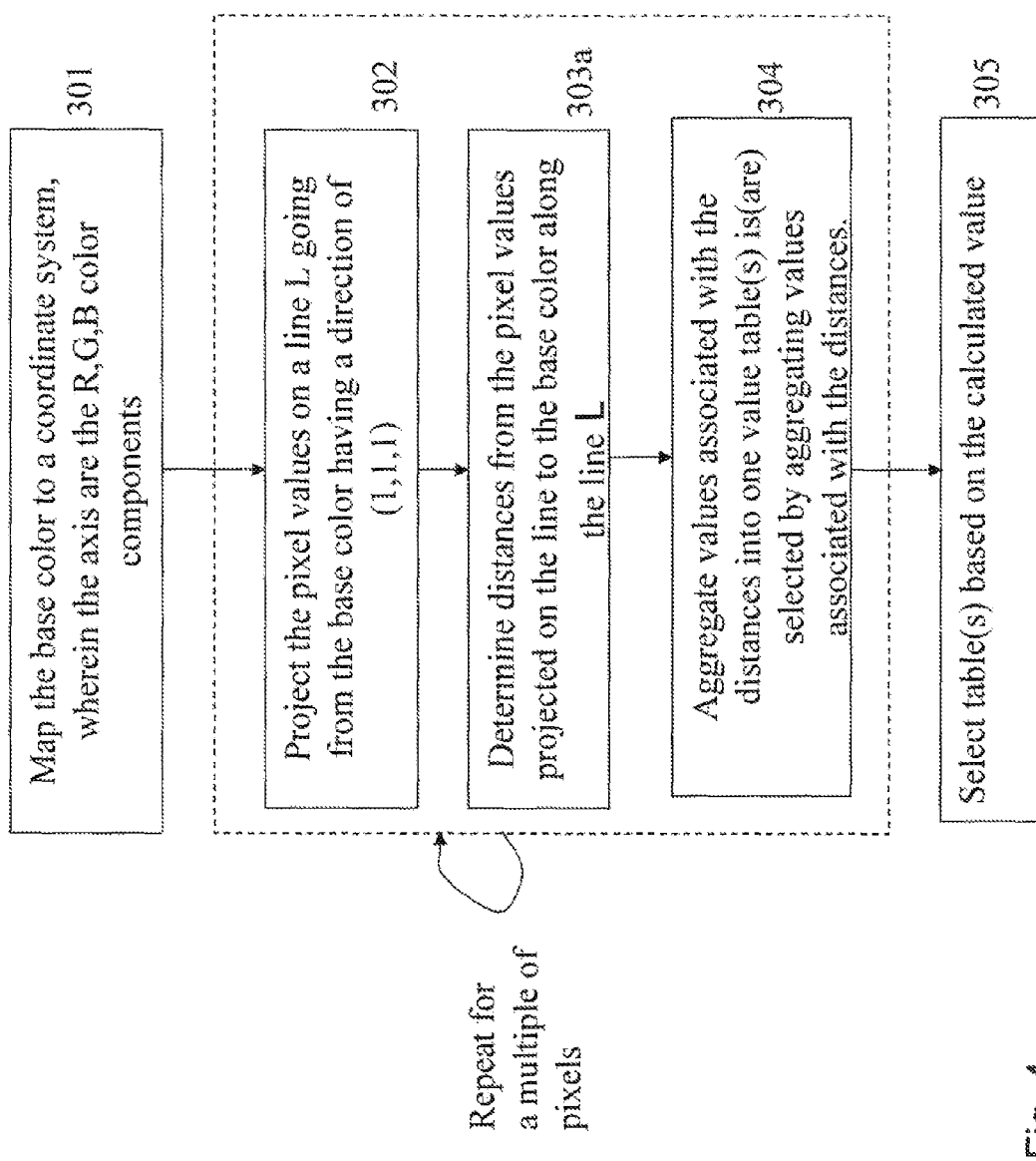

According to a further embodiment illustrated in the flowchart of FIG. 4, the distance cp is explicitly calculated in order to determine suitable table(s). Hence, the distances from the points projected 302 on the line to the base color along the line are calculated 303a. These distances can be aggregated 304 into one value and based on this value, a suitable table is selected 305. This embodiment is exemplified below.

To project bc onto the line L, the projection formula is used:

$$bc_p = \frac{bc \cdot (1, 1, 1)}{(1, 1, 1) \cdot (1, 1, 1)}(1, 1, 1) = a(1, 1, 1),$$

where "a" is a scalar and indicates the distance to the base color. Note that "a" is a so called "signed distance" which means that it indicates a distance but can be negative. A positive value of, e.g., 5, will indicate that the point is a certain distance away from the base color, but larger than the base color. A negative value of, e.g., −5, will mean that the point is at the same distance but on the opposite side of the base color, i.e., the point is smaller than the base color. It can now be seen that if a table is selected where "a" is an entry, it is possible to achieve the result cp, since $$b+a(1,1,1)=c_p$$

In order to represent all colors in the halfblock, it is important that a table with values big enough is selected to cover all the projections of the pixel colors. In detail, it is possible to calculate "a" for each pixel in the halfblock, and then select the one with the biggest absolute value. Taking the absolute value of "a" may be advantageous in order to remove the sign from the signed distance. "a" is calculated using $$a = \frac{bc \cdot (1, 1, 1)}{(1, 1, 1) \cdot (1, 1, 1)} \quad \text{Eqn 1}$$
$$= \frac{(c-b) \cdot (1, 1, 1)}{1 \cdot 1 + 1 \cdot 1 + 1 \cdot 1}$$

-continued $$= \frac{c_r - b_r + c_g - b_g + c_b - b_b}{3},$$

where $c_r$ is the red component of color c, etc. the maximum absolute value k is then calculated:

$$k=\max \text{abs}(a)=\max\{\text{abs}(a_1),\text{abs}(a_2),\text{abs}(a_8)\}, \quad \text{Eqn 2}$$

and then the table for which the largest entry is closest to k is selected. Here $a_1$ is the "a"-value for the first pixel in the half-block, $a_2$ is the second etc.

As an example, assume that the "a"-value with the largest magnitude was "a"=−18. The value k then equals +18, and the table 1 should be selected since its biggest component is 17, which is close to 18.

Accordingly, the table(s) may be selected by aggregating 304 the distance-relating-values to a single value relating to the aggregate distances. Hence k is determined from $a_1, a_2, \ldots a_8$. That can be achieved e.g. by comparing the values of the tables with the longest distance from the base color along the line L. In particular, the largest absolute value of the respective table may be compared with the longest distance along the line L (i.e. the distance |b−$c_p$|) and the table or tables having a biggest absolute value (60 in table 4) which corresponds best with longest distance is selected 305.

According to an embodiment, the pixels are quantized once the best table is found. When the best table has been found, it is evaluated which of the four table values are best for each pixel. This is done by looking at the value "a" that was calculated for each pixel, and mapping that to the closest entry in the table. Assume for instance that the base color is (173, 200, 100) and that table 1 is selected, which has the four entries {−17, −5, 5, 17}. Assume that the first pixel has color (179, 206, 106). It's "a" value then equals (179−173+206−200+106−100)/3)=6. Among the four entries in the table, value a=6 is closest to 5. This is therefore the selected entry and the corresponding two-bit bit index can now be stored.

According to another embodiment, the pixels are quantized once the best table is found. When the best table has been found, it is evaluated which of the four table values are best for each pixel. This is done by calculating the error for each pixel. Assume for instance that the base color is (173, 200, 100) and that table 1 is selected, which has the four entries {−17, −5, 5, 17}. Assume that the first pixel has color (179, 206, 106). It is then possible to calculate what the resulting color would be if the first entry in the table, −17 would have been selected:

col1=(173,200,100)+(−17)*(1,1,1)=(156,183,83)

The error would thus be err1=sse((179,206,106)−(156,183,83))=(179−156)$^2$+(206−183)$^2$+(106−83)$^2$=(−23)$^2$+(−23)$^2$+(−23)$^2$=1587, where sse( ) stands for summed squared error. In the same manner, the entry −5 would generate a color col2=(173,200,100)+(−5)*(1,1,1)=(168,195,95)

and the error would be err2=sse((179,206,106)−(168,195,95))=(179−168)$^2$+(206−195)$^2$+(106−95)$^2$=363.

Similarly, col3=(173,200,100)+(5)*(1,1,1)=(178,205,105) and err3=(179−178)$^2$+(206−206)$^2$+(106−105)$^2$=1+1+1=3.

Finally, col4=(190,217,117) and err4=363

It can be seen here that err2 is the smallest of the four. Hence the best value is +5, and it is known what two-bit index to store for that pixel. The process now goes on to the next pixel, and so on. The best error for each pixel is summed together to produce an error for that table. It could then be used to compare against another table if necessary (see below).

According to a further embodiment, it is possible to use weights for the error calculation so that the error measure is more sensitive to errors in the green component. This can be done by calculating the errors using err_weighted=0.299*(R−r)$^2$+0.587*(G−g)$^2$+0.114*(B−b)$^2$, where (R, G, B) is the original pixel and (r, g, b) is the color generated by a certain table value. Since the weights 0.299, 0.587 and 0.114 roughly correspond to the sensitivity to the red, green and blue colors in the human visual system, the weighted error measure above often produces better-looking pictures.

An extreme version of this is to set the weight for green to one and the weights for red and blue to zero. This means that the formula can be simplified to err_green=(G−g)$^2$.

Since no summation is done, comparing two errors calculated with the above formula will give exactly the same result as comparing two errors computed using the below formula although the error values will differ.

err_green'=abs(G−g)

Since the err_green measure does not take neither the red nor the blue channel into consideration, this error measure will produce an image that looks worse than the one produced for err_weighted, but it will be quicker to compress. In many cases it may even look better than the unweighted error.

According to a yet further embodiment two tables that are determined to be the most suitable tables. Both these selected tables are tested. Although more than one table is selected and tested the computation time is still reduced compared to test all available tables. In reality it can be advantageous to test both the table which has a smaller value than k and the one which has a bigger value. In the example, since 17<=18<=29, table 1 should be tested since it contains 17 and table 2 since it contains 29. The error for table 1 is calculated and compared with the error for table 2, and the representation that gives the smallest error is chosen. To test the two closest tables in this way gives a significant improvement in quality compared to trying only the closest. If the errors produced by two different tables are compared in this way, the measures err_green and err_green' are no longer equivalent, since a summation takes place between pixels. Using err_green will then typically produce a nicer-looking result of the two.

If a k-value smaller than 8 is obtained, table 0 is the table which is slightly larger. But the table which is slightly smaller is also table 0. Since table 0 is the most commonly used table, this special case is quite common, and to avoid having to try table 0 twice (which is expensive computationally) it is wise to first check if the two tables to check are the same. If they are, only one check is necessary. A similar thing happens if there is a k-value larger than 183. This leads to the following pseudo code:

```
calculate k
table_s = find table which last entry is smaller than k
table_t = find table which last entry is larger than k
```

```
    err_s = calculate error with table s
if(table_s != table_t)
    err_t = calculate error with table_t
    if( err_s < err_t)
        use table_s
    else
        use table_t
    end
else
    use table_s
end
```

An alternate embodiment that gives yet more quality is to try three tables but still reduces the computation time: the table with slightly larger values, slightly smaller values, and the table with even smaller values. In the example above it would be table 2, table 1 and table 0. Again it would be wise to check that the tables are indeed different before calculating their errors, to avoid unnecessary computation.

In yet an alternate embodiment, a different function may be used to select k. For instance, if most of the a-values are quite small, but one sticks out to be very large, the function max(abs(a)) as disclosed above may produce too large a k. Therefore it may be advantageous to instead use the average of the absolute values $$k = \text{average abs}(a_i) = (1/8)*(\text{abs}(a_1) + \text{abs}(a_2) + \ldots + \text{abs}(a_8))$$

However, this may produce too small a value, so in yet an alternate embodiment the average multiplied by a constant:

$$k = w*\text{average abs}(a_i) = (1/8)*(\text{abs}(a_1) + \text{abs}(a_2) + \ldots + \text{abs}(a_8))$$

where w is a number greater than one. It is also possible to use a weighted average of the maximum value and the average value.

Many error measures are based on squared errors, and therefore put a greater emphasis on large errors. An example is the PSNR measure that is based on the mean squared error. A large error in one pixel of say −100, will be squared to (−100)*(−100)=10000 and will affect the PSNR score more than 7 pixels that have the error 10 will together, since 10*10*7=700. Since quality is often measured in PSNR it is important to select a k that will minimize PSNR. It may therefore be important to weight large errors more than small. This can be done by selecting k the following way:

$$k = w*\text{sqrt}(\text{average}(a_i)^2) = \text{sqrt}((1/8)*(a_1 a_1 + a_2 a_2 + \ldots + a_8 a_8))$$

where w is a constant that is greater than or equal to one, and where sqrt(x) calculates the square root of x.

Figure 5:
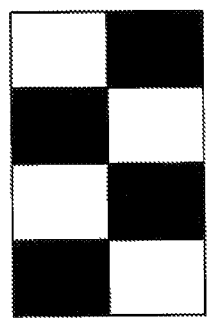
FIG. 5 shows a pattern to be used for selecting a table to represent luminance characteristics according to embodiments of the present invention.

In some cases it is desirable to speed up the compression even further. One way to speed things up can be to calculate k from only a part of the pixels. For instance, Equation 1 and Equation 2 could be calculated only on half of the pixels in the block in a checkerboard pattern according to FIG. 5.

Thus in one embodiment, Equation 1 will only be executed for the pixels marked with black and Equation 2 will only take the maximum of the resulting four $a_i$-values.

Alternatively, even fewer pixels may be used in Equations 1 and 2, making them execute even faster. The downside to doing so is that some pixels that are not used (the white pixels in FIG. 5) may differ a lot from the other pixels. As an example, if one or more of the white pixels have a much larger magnitude of the a-value (deviation from the base color) than the black pixels, too small a table will be selected and the errors in those pixels will be much too big.

Another way to speed up the calculations is to select the same table for both of the two block-halves. For instance, it is possible to calculate the k-value for only the left block, and use the same k-value for the right block. That way, Equation 1 only needs to be calculated for the eight pixels in the left block, instead of both blocks. Since pixels close to each other often have similar values, the tables chosen in the two half blocks will often be very similar and this extrapolation will work most of the time.

Sometimes, however, pixels in one half-block will be very different from pixels in the neighboring half-block, and then this extrapolation fails. So a small test can be performed to see how similar the half-blocks are. That can be done by testing the base colors against each other. If the difference between the base colors is greater than a threshold value, it can be assumed that the half-blocks are too different to be forced to use the same table. However if they are similar enough, the same table is used. Assume that the base color for the first half-block is stored in b1[3], where b1[0] holds the red component, b1[1] the green and b1[2] the blue. Assume that b2[3] holds the base color for the other half-block. Then the following pseudo code can be used to decide whether to use the same table or not:

```
if( (b1[0]−b2[0])² + (b1[1] − b2[1])² + (b1[2] − b2[2])² < q)
    use the k value from half-block 1 also for half block 2
else
    calculate separate k values
end
where q is a threshold value.
```

As a special case, if b1=b2 (for all three components) then the k value can be calculated for all the pixel values in the block. Thus Equation 1 and 2 are calculated not for the eight pixels in the half-block but for the 16 pixels in the block. This will still be slightly worse than computing different k for the two halves but will often work well.

A common advantage with all the different embodiments of the invention is that the computation time is reduced significantly while preserving almost the same quality. This tradeoff between quality and computation time is very beneficial.

The above-described method can be implemented in an arrangement comprising one or more CPUs or one or more GPUs, or a combination thereof. Each CPU can also have one or several cores, and each GPU can also have one or several cores. This implies that a processor comprising one or a combination of multiple processor cores, CPUs or GPUs is configured to map the base color to a coordinate system, where axes of the coordinate system are the R,G,B color components, to project for a plurality of pixels of the block pixel values of the block to a line L that goes through the base color and has the direction (1,1,1) in the coordinate system, to determine a value relating to distances between the base color and the projection of the pixel values to the line L, and to select at least one table comprising a set of values to be used for representing luminance characteristics of each pixel values based on the determined value.

According to one embodiment, the processor is further configured to determine a value relating to distances between the base color and the projection of the pixel values to the line L by determining distances from the pixel values projected on the line to the base color along the line L.

According to a further embodiment, the processor is configured to select table(s) by aggregating values associated with the distances into one value, wherein the processor is configured to aggregate the values by selecting a maximum value or an average value of the values associated to the distances.

The processor is according to a further embodiment configured to select more than one table and to test said selected tables and to use the table giving the best performance for representing luminance characteristics.

According to a yet further embodiment, the processor is configured to take a subset of the pixel values of the block into account when determining a value relating to distances between the base color and the projection of the pixel values to the line L.

Figure 6:
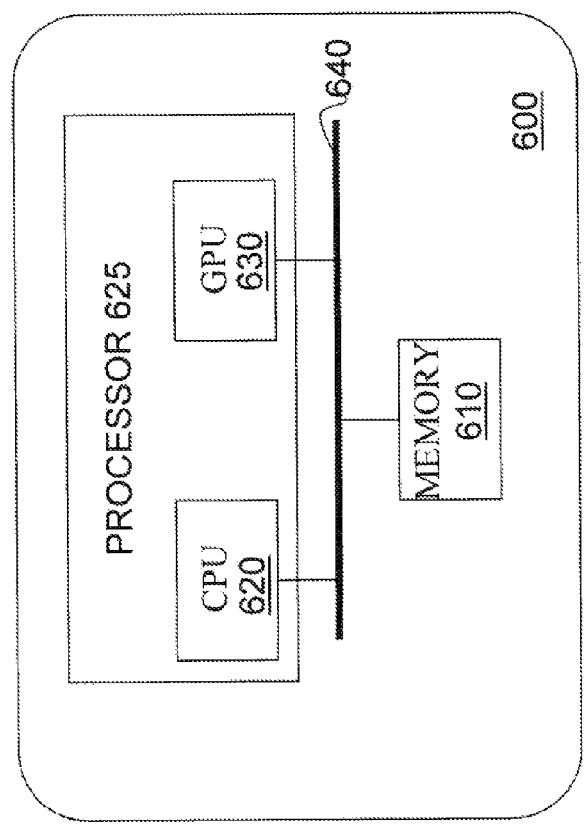
FIG. 6 illustrates schematically an arrangement wherein the embodiments of the present invention can be implemented.

FIG. 6 exemplifies the arrangement which can implement the embodiments. The arrangement 600 comprises a bus 640 connecting a CPU 620, GPU 630 and a memory 610. The CPU 620 and the GPU 630 may be situated on the same chip or on different chips. The arrangement according to embodiments of the present invention comprising one or more CPUs and/or GPUs may be associated with a memory storing the textures to be compressed. If the method is carried out by means of software, the software code portions adapted to carry out the method may also be stored in the memory. These software code portions are processed by the CPU and/or GPU. It should be noted that the embodiments can be implemented by hardware or software or a combination thereof.

Accordingly, the processor 625, i.e. the CPU and/or GPU according to embodiments of the present invention can be adapted to provide signed distance related values which takes into account the base value as well as at least some of the pixels values in the block. Alternatively, the processor can provide the base value itself from the pixel values. Further, the processor is adapted to produce values that represent signed distance values between the base value and the pixel values projected onto the line with direction (1,1,1) that goes through the base value. One signed distance related value per pixel is produced for at least one pixel in the block. The processor may further be configured to calculate an aggregated value from the signed distance related values by taking the output from one pixel value by one and aggregating them into a value that will represent all the values. As an example, it can take the maximum of the absolute values of the signed distances. Hence the processor according to an embodiment is adapted to select at least one table based on the aggregated value. If more than one table is selected, the table estimated to provide the best performance is chosen by calculating errors resulting from the different tables.

REFERENCES

[1] "iPACKMAN: High-Quality, Low-Complexity Texture Compression for Mobile Phones" Jacob Strom and Tomas Akenine-Moller
*Graphics Hardware* (2005), ACM Press, pp. 63-70.
(Describes the ETC1 compression format)

The invention claimed is:

1. A method in a processor for texture compression, wherein a texture to be compressed is divided into blocks, each comprising a plurality of pixels, and each block is represented by a base color and luminance information for each pixel, and wherein, for a block to be compressed, the method comprises:
    mapping the base color to a coordinate system, where axes of the coordinate system are the R,G,B color components;
    for a plurality of pixels of the block, projecting pixel values of the block to a line L that goes through the base color and has the direction (1,1,1) in the coordinate system;
    determining a value relating to distances between the base color and the projection of the pixel values to the line L; and
    selecting at least one table comprising a set of values to be used for representing luminance characteristics of each pixel values based on the determined value.

2. The method according to claim 1, wherein the determination of the value relating to distances between the base color and the projection of the pixel values to the line L is performed by determining distances from the pixel values projected on the line L to the base color along the line L.

3. The method according to claim 1, wherein the at least one table is selected by aggregating values associated with the distances into one value.

4. The method according to claim 3, wherein the aggregation is performed by selecting a maximum value of the values associated with the distances.

5. The method according to claim 3, wherein the aggregation is performed by selecting an average value of the values associated with the distances.

6. The method according to claim 1, wherein more than one table is selected and said selected tables are tested and the selected table giving the best performance is used for representing luminance characteristics.

7. The method according to claim 1, wherein a subset of the pixel values of the block is taken into account when determining the value relating to distances between the base color and the projection of the pixel values to the line L.

8. A processor for texture compression, wherein a texture to be compressed is divided into blocks, each comprising a plurality of pixels, and each block is represented by a base color and luminance information for each pixel, and wherein, for a block to be compressed, the processor is configured to:
    map the base color to a coordinate system, where axes of the coordinate system are the R,G,B color components;
    project for a plurality of pixels of the block pixel values of the block to a line L that goes through the base color and has the direction (1,1,1) in the coordinate system;
    determine a value relating to distances between the base color and the projection of the pixel values to the line L; and
    select at least one table comprising a set of values to be used for representing luminance characteristics of each pixel values based on the determined value.

9. The processor according to claim 8, wherein the processor is configured to determine a value relating to distances between the base color and the projection of the pixel values to the line L by determining distances from the pixel values projected on the line to the base color along the line L.

10. The processor according to claim 8, wherein the processor is configured to select the at least one table by aggregating values associated with the distances.

11. The processor according to claim 10, wherein the processor is configured to aggregate the values by selecting a maximum value of the values associated with the distances.

12. The processor according to claim 10, wherein the processor is configured to aggregate the values by selecting an average value of the values associated with the distances.

13. The processor according to claim 8, wherein the processor is configured to select more than one table, to test said selected tables, and to use the selected table giving the best performance, for representing luminance characteristics.

14. The processor according to claim 8, wherein the processor is configured to take a subset of the pixel values of the block into account when determining the value relating to distances between the base color and the projection of the pixel values to the line L.

* * * * *